(12) United States Patent
Reimanis et al.

(10) Patent No.: US 7,696,116 B2
(45) Date of Patent: Apr. 13, 2010

(54) IMPLEMENTING A PRESSURE-INDUCED PHASE TRANSFORMATION IN BETA-EUCRYPTITE TO IMPART TOUGHENING

(75) Inventors: Ivar Reimanis, Golden, CO (US); Chris Seick, Golden, CO (US); Kyle Fitzpatrick, Arvada, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 11/689,366

(22) Filed: Mar. 21, 2007

(65) Prior Publication Data

US 2007/0225153 A1    Sep. 27, 2007

Related U.S. Application Data

(60) Provisional application No. 60/785,072, filed on Mar. 23, 2006.

(51) Int. Cl.
    C04B 35/00    (2006.01)
(52) U.S. Cl. .................................................. 501/128
(58) Field of Classification Search ............ 501/128, 501/4, 105
    See application file for complete search history.

(56) References Cited

U.S. PATENT DOCUMENTS

| | | | | |
|---|---|---|---|---|
| 3,637,453 | A | * | 1/1972 | Simmons .................... 428/410 |
| 3,907,535 | A | * | 9/1975 | Muller ........................ 65/33.6 |
| 4,098,725 | A | | 7/1978 | Yamamoto et al. |
| 4,800,065 | A | * | 1/1989 | Christodoulou et al. ..... 420/129 |
| 4,806,704 | A | | 2/1989 | Belke, Jr. et al. |
| 5,057,018 | A | | 10/1991 | Bowen et al. |
| 5,147,829 | A | | 9/1992 | Hench et al. |
| 6,566,290 | B2 | | 5/2003 | Bealle et al. |

FOREIGN PATENT DOCUMENTS

| | | |
|---|---|---|
| EP | 0 217 176 | 4/1987 |
| JP | 56120538 | 9/1981 |
| JP | 2225341 | 7/1990 |
| JP | 3290352 | 12/1991 |
| JP | 2001-302338 | 10/2001 |
| JP | 2001-302339 | 10/2001 |
| JP | 2001-302340 | 10/2001 |
| JP | 2002-179459 | 6/2002 |
| JP | 2003-023064 | 1/2003 |
| JP | 2003-026470 | 1/2003 |

(Continued)

OTHER PUBLICATIONS

Wada et al. JP2001-302340, Published Oct. 31, 2001 (machine translation).*

(Continued)

*Primary Examiner*—Melvin C Mayes
*Assistant Examiner*—Stefanie Cohen
(74) *Attorney, Agent, or Firm*—Greenlee, Winner and Sullivan, P.C.

(57) ABSTRACT

The invention provides composite materials comprising eucryptite particles distributed in a matrix material other than eucryptite. The matrix material may be a ceramic material such as an oxide ceramic. In an embodiment, the eucryptite particles are transformed from the β-phase to the ε-phase during fabrication of the composite. This phase transformation can enable a eucryptite-based transformation toughening mechanism.

13 Claims, 4 Drawing Sheets

FOREIGN PATENT DOCUMENTS

| | | |
|---|---|---|
| JP | 2003-176188 | 6/2003 |
| JP | 2004-284846 | 10/2004 |
| WO | WO 2005009916 | 2/2005 |

OTHER PUBLICATIONS

Geodakyan et al. (2004) "The Influence of Beta-Eucryptite Glass Ceramics on the Structure and Main Properties of Alumina Ceramics," *Ceram. Eng. Sci. Proc.* 25(4):37-42.

Pillars et al. (1973) "The Crystal Structure of Beta Eucryptite as a Function of Temperature," Am. Mineralogist, 58:681-690.

Reimanis et al. (May 2007), "Spontaneous Ejecta from β- Eucryptite Composites," J. Am. Ceram. Soc., 90(8), 2497-2501.

Sarno et al. (1995) "Toughening Mechanisms for a Zirconia-Lithium Aluminosilicate Glass-Ceramic," *J. Mater. Sci.* 30:4380-4388.

Shimada et al. (1996) "Simultaneous Fabrication of a Composite with Low Thermal Expansion and High Strength in the Eucryptite-Yttria-Stabilized PSZ System," *J. Mater. Sci.* 31:3691-3695.

Wang et al. (2002) "New Aluminum Matrix Composite with Much Lower Coefficient of Thermal Expansion and Higher Strength," *J. Mater. Sci. Lett.* 21:737-738.

Zhang et al. (2002) "A New Polymorph or Eucryptite ($LiAlSiO_4$), ϵ-Eucryptite, and the Thermal Expansion of α and ϵ-Eucryryptite at High Pressure," *Am. Mineralogist* 87:566-571.

Zhang et al. (Apr. 2005) "Pressure-Induced Amorphization and Phase Transformations in $β-LiAlSiO_4$," *Chem. Mater.* 17:2817-2824.

* cited by examiner

IMPLEMENTING A PRESSURE-INDUCED PHASE TRANSFORMATION IN BETA-EUCRYPTITE TO IMPART TOUGHENING

CROSS-REFERENCE TO RELATED APPLICATIONS

This application claims the benefit of U.S. Provisional Application 60/785,072, filed Mar. 23, 2006, which is hereby incorporated by reference to the extent not inconsistent with the disclosure herein.

ACKNOWLEDGMENT OF GOVERNMENT SUPPORT

This invention was made with government support under W911NF-06-1-0338 awarded by the U.S. Army Research Office. The government has certain rights in the invention.

BACKGROUND OF THE INVENTION

The invention is in the field of composite materials, in particular composite materials which contain eucryptite particles capable of undergoing transformation between the beta (β) and epsilon (ε) phases. The invention provides composite materials which are capable of transformation toughening behavior, methods for making these materials, and methods for transformation toughening of materials.

Figure 1A:
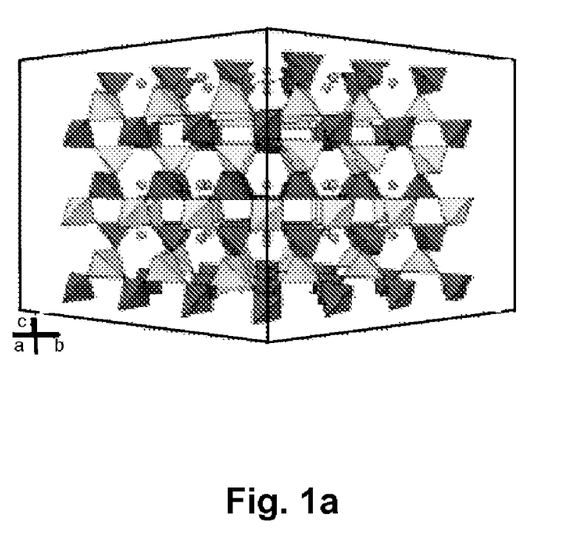
FIG. 1a illustrates the β-eucryptite structure from a view parallel to [110].
Figure 1B:
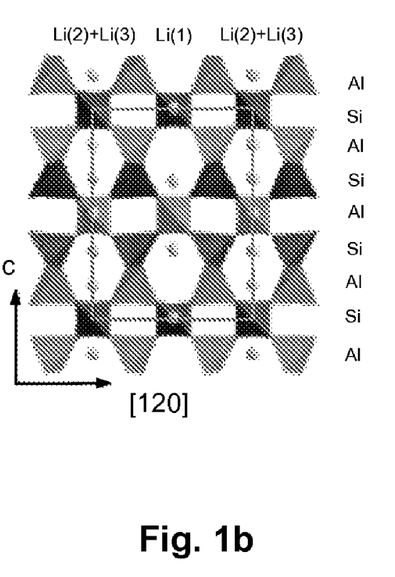
FIG. 1b illustrates the β-eucryptite structure from a view projected along the a axis.

Crystalline β-eucryptite (LiAlSiO$_4$) is a stuffed derivative of β-quartz (space group P6$_4$22 or P6$_2$22) where Al$^{3+}$ ions replace half of the Si$^{4+}$ ions and charge is compensated by the addition of Li$^+$ ions (Palmer 1994; Buerger 1954; Winkler 1948; Schulze 1972; Tscherry 1972a; Tscherry 1972b; Pillars 1973; Guth 1979). The Li$^+$ ions take different positions within channels of the c-axis (Palmer, 1994), leading to minor structural variations that are very difficult to detect experimentally, but are believed to be important in governing the physical properties. The Li$^+$ ions may be viewed as 'propping open' the framework, thereby stabilizing the relatively open β-quartz structure. FIGS. 1a and 1b illustrate two schematics of the structure. In both figures the darker tetrahedra represent SiO$_4$ and the lighter ones represent AlO$_4$. Li cations are represented by the small spheres. In FIG. 1a a view parallel to [110] is shown. (from Sprengard 2000). In FIG. 1b the view is projected along a-axis (from Zhang 2005). Two different Li positions along the channels parallel to the c-axis are indicated, and the unit cell is marked by the solid rectangle. The framework of β-eucryptite may be described as two helical chains of SiO$_4$ and AlO$_4$ tetrahedra that spiral around a 6-fold screw axis (Xu 1999a; Palmer 1994). The SiO$_4$ and AlO$_4$ tetrahedra positions alternate within the (001) layers, and the Li is hence ordered within two distinct channels. Due to the ordering of the cations, a superstructure exists (doubled translational periodicity along the a and c axes) that does not occur in β-quartz. This highly anisotropic framework leads to highly anisotropic physical properties for β-eucryptite. As the stoichiometry changes to Si-rich, the ordering fades away and the superstructure is eventually lost (Xu 1999a). Disorder is also induced at higher temperatures.

Because of its highly anisotropic structure, β-eucryptite is a fascinating material in regards to its physical properties. For example, ordered β-eucryptite exhibits an average coefficient of thermal expansion (CTE) that is negative; basically, the expansion along the a-axis (~8×10$^{-6}$/° C.) is more than cancelled by the contraction along the c-axis (~18×10$^{-6}$/° C.). As another example, the compressibility of β-eucryptite is highly anisotropic: it is largely incompressible along the c-axis, but is compliant parallel to the (001) plane. Its negative CTE has attracted much attention over the years from a fundamental and engineering point of view. The discovery of thermal contraction in β-eucryptite was made by Hummel in 1951 (Hummel 1951), and the reason for it was subsequently studied by a number of researchers (Hortal 1975; Gillery 1959; Tien 1964), and finally attributed to Si/Al tetrahedral deformation (Palmer 1994). More recently, this unusual behavior has been attributed also to two other processes (all of which are interdependent): 1) Li positional disordering and 2) tetrahedral tilting (Xu 1999a; Phillips 2000; Xu 2001). Because of these unique structural characteristics, some of the fundamental studies on LiAlSiO$_4$ materials have been conducted simply because they provide insight into general crystal-chemical systematics (Palmer 1994; Xu 1999b). It is also noted that β-eucryptite exhibits anisotropic superionic conductivity with the transport of Li$^+$ ions parallel to the c axis channels, hence its interest in lithium-based batteries.

There exist two well-established polymorphs in addition to β-eucryptite: 1) α-eucryptite which exists over a range of temperatures that depend on the exact stoichiometry, and is stable at ambient conditions, but is typically kinetically hindered (Xu 1999; Beal 1994); and 2) γ-eucryptite, a metastable phase relatively recently discovered (Dondu 1986). It has been shown that β-eucryptite is no longer stable at ambient temperatures with less than about 35 mol % substitution of Li$^+$+Al$^{3+}$ for Si$^{4+}$ (Xu 2000); in that case α-eucryptite forms. The critical temperature of the β-α transformation depends on the relative (Li+Al)/Si concentration.

Recently, a third polymorph, ε-eucryptite, has been discovered (Zhang 2002). In that study, in-situ compression experiments at ambient temperature, revealed that β-eucryptite transforms reversibly to an orthorhombic phase, which the authors termed ε-eucryptite, starting at pressures of 0.83 GPa (Zhang 2002). If heated to temperatures above 600° C., while under pressures above 0.83 GPa, it transforms irreversibly to α-eucryptite (Zhang 2002). More recently, it was observed that at pressures above about 5 GPa it begins to amorphize until about 17 GPa, above which it is completely amorphous (Zhang 2005). The fact that this pressure is relatively low for pressure-induced amorphization in most materials (Sharma 1996) is believed to be due to the relatively open framework structure of β-eucryptite (FIGS. 1a and 1b). Interestingly, release of the pressure before it reaches 17 GPa leads to re-crystallization of β-eucryptite, indicating the presence of a kind of structural memory (Zhang 2005). On the other hand, exposure to pressures above 17 GPa leads to a complete and irreversible amorphization. The theoretical density of β-eucryptite is about 2.34 g/cm$^3$, whereas that for ε-eucryptite is about 7.7% higher at 2.52 g/cm$^3$ (Xu 2005).

Figure 2:
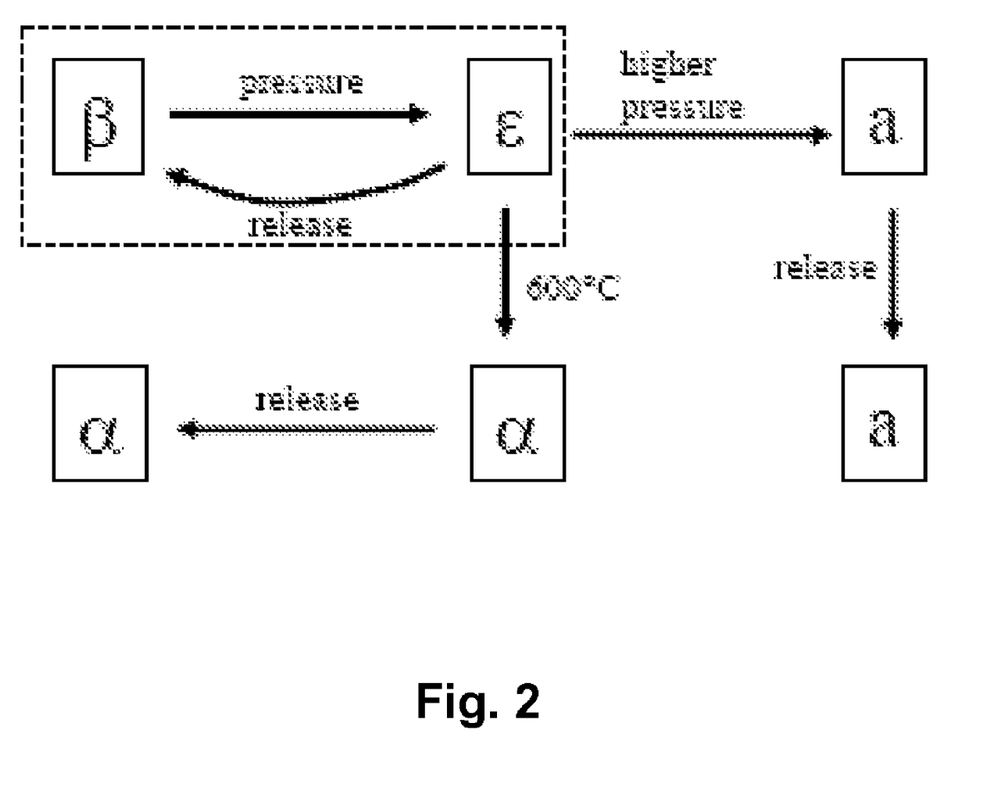
FIG. 2 is a schematic of transformations in the eucryptite system.

FIG. 2 depicts the sequence of these transformations. In FIG. 2, the symbol "a" represents the amorphous phase. It is believed that only one partial pressure-temperature diagram for this system exists to date (Zhang 2005). Two studies documenting pressure-induced transformations of β-eucryptite to ε-eucryptite or the amorphous phase are those by Zhang et al. (2002, 2005). It is noted that pressure induced transformations have been observed in other minerals with the relatively open β-quartz structure, but in most cases, the transformation is amorphization (Richet 1997; Huang 1998; Secco 1999). Other than d-spacings and lattice parameters from x-ray diffraction data (Zhang 2002), nothing is believed to be known about the crystal chemistry of ε-eucryptite, and the only properties believed to be measured are the coefficients of thermal expansion.

Composites combining eucryptite with other materials have been reported, the composites typically have small positive or negative coefficients of thermal expansion. U.S. Pat. No. 6,566,290 to Beall et al. reports a biphasic ceramic having a first phase of beta-eucryptite and a second phase of a higher temperature phase such as lithium aluminate spinel, lithium aluminate, corundum, and combinations thereof. The composites have at most 50% beta eucryptite and an open porosity between 35-65% by volume. Shimada et al. (1996) report composites made from β-eucryptite (5 micron average initial diameter) and yttria-stabilized partially stabilized zirconia (PSZ) (crystallite size 40 or 24 nm). Shimada et al. explored compositions with 35 or greater wt. % beta-eucryptite (because beta eucryptite is less dense than zirconia, the volume percents were greater than 35%). Japanese Publication Nos. 2001-302338 and 2001-302339 report composites of beta eucryptite and silicon carbide and/or silicon nitride. U.S. Pat. No. 5,147,829 to Hench et al. report sol-gel derived $SiO_2$/oxide powder composites, where the oxide powder can consist of beta eucryptite crystals.

U.S. Pat. No. 4,806,704 to Belke, Jr. et al. report aluminum matrix composites with beta-eucryptite as the additive in a volume percent up to 60%. European Patent Publication EP0217176 reports composite materials made of metallic and nonmetallic components. The metallic component can be 20-80% copper and/or molybdenum and the nonmetallic component can be beta eucryptite. Wang et al. (2002) report a composite of β-eucryptite particles (5-10 micron diameter) and aluminum borate whiskers (diameter 0.5-1 micron and length 10-30 micron) in 6061 aluminum alloy. The total volume fraction of reinforcement was 40% and the volume ratio between particles and whiskers was 2:1.

BRIEF SUMMARY OF THE INVENTION

In an embodiment, the invention provides composite materials comprising eucryptite particles distributed in a matrix material other than eucryptite. The resulting material is substantially dense, with porosity less than about 10%. The composites of the invention can display toughness superior to that of the unreinforced matrix material.

In an embodiment, the invention provides a composite material comprising a matrix material selected from the group consisting of alumina and zirconia and eucryptite particles dispersed in the matrix material, the particles having a size between 0.1 and 10 microns and the volume fraction of the particles being between 5 and 30 volume percent.

In an embodiment, a plurality of β-eucryptite particles are transformed to the $\mathcal{E}$-phase during fabrication of the composite. The $\mathcal{E}$-eucryptite particles may be stabilized by compressive forces or by thermodynamic metastability. If the $\mathcal{E}$-phase particles are stabilized by compressive forces, the particles are surrounded with a sufficiently confining matrix to suppress transformation to β-eucryptite when no crack is present. For stoichiometric eucryptite, the compressive stress required to act on the particle is 0.83 GPa based on transformation studies (Zhang 2002). Without wishing to be bound by any particular belief, the critical pressure for the β→$\mathcal{E}$ transformation may change with changes in stoichiometry or with alloying (substitution of other cations such as Mg, Zn for Li). Changes in stoichiometry or alloying may also affect the critical temperature for the $\mathcal{E}$→α transformation.

In an embodiment, the invention provides a composite material comprising ε-phase eucryptite particles and a matrix material other than eucryptite. The matrix material may be selected from the group consisting of ceramics, metals, polymers, or cement. In an embodiment, the eucryptite particles have a size between 0.1 and 10 microns and the volume fraction of the particles is between 5 and 30 volume percent.

Figure 3A:
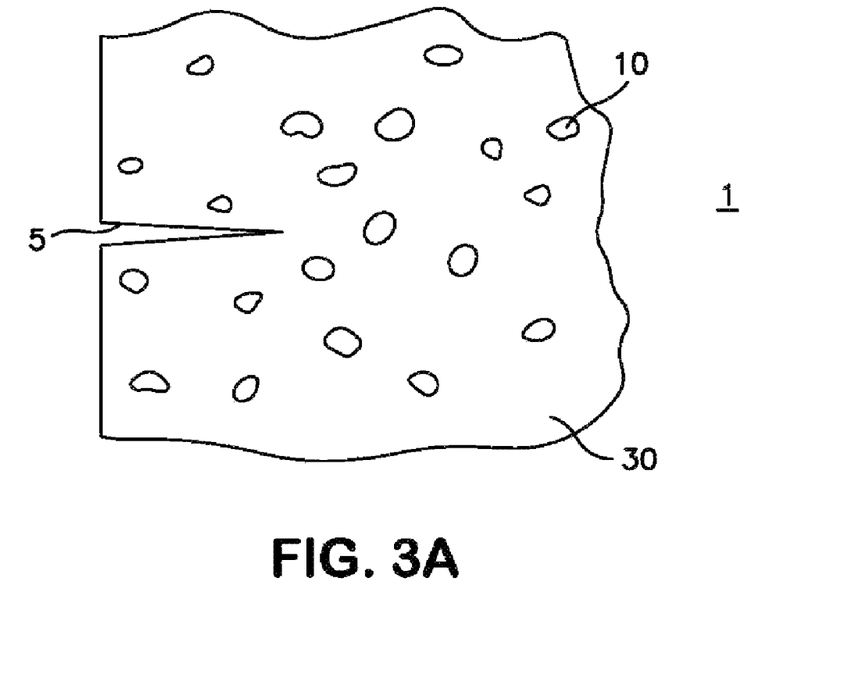
FIG. 3A schematically illustrates a cross-sectional view of a crack in a composite material having ε-eucryptite particles distributed in a matrix.
Figure 3B:
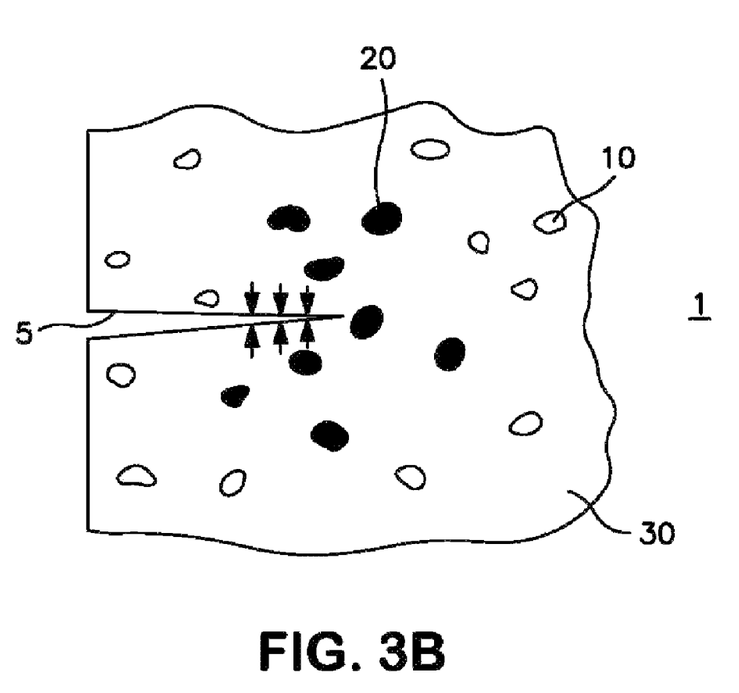
FIG. 3B illustrates extension of the crack relative to its position in FIG. 3A.

In another embodiment, the invention provides a ceramic composite material comprising: a ceramic matrix material other than eucryptite and $\mathcal{E}$-eucryptite particles dispersed in the matrix material, the particles having a size between 0.1 and 10 microns and the volume fraction of the particles being between 5 and 30 volume percent The composite materials of the invention can exhibit a toughening mechanism provided by $\mathcal{E}$→β transformation of the eucryptite particles. Specifically, the transformation is stimulated by a crack tip stress field, as schematically illustrated in FIGS. 3A and 3B. FIG. 3A illustrates a cross-sectional view of crack 5 in a composite material 1, the composite having ε-eucryptite particles 10 distributed in matrix 30. FIG. 3B illustrates extension of crack 5 relative to its position in FIG. 3A. Analogous to transformation toughening in $ZrO_2$ (Green 1989; Ruhle 1987), upon crack extension, the crack tip stress field induces a phase transformation from $\mathcal{E}$ to β. In FIG. 3B, the β-eucryptite particles 20 are shaded to differentiate them from the ε-eucryptite particles 10. The resulting volume expansion leads to compressive tractions in the wake of the crack tip, illustrated by the arrows in FIG. 3B. The latter leads to a rise in the fracture resistance as the crack propagates (R-curve behavior), for which the mechanics are very well established (Green 1989). Unlike other systems that undergo a pressure-induced phase transformation (Kriven 1982), the present one occurs at relatively low pressures, and therefore is within the realm of conventional processing and will not substantially degrade the matrix strength.

The composite materials of the invention can also provide toughening through crack deflection by the eucryptite particles.

The invention also provides a method for toughening of a material by forming a composite of eucryptite particles in a matrix of the material. In an embodiment, the eucryptite particles are $\mathcal{E}$-eucryptite particles. The fracture toughness of these composite materials is superior to that of the unreinforced matrix material.

The invention also provides methods for making composites of ε-eucryptite particles in a matrix material. In an embodiment, the method comprises the steps of providing β-eucryptite particles and a matrix precursor material; combining the β-eucryptite particles with the matrix precursor material; and consolidating the combination of the particles and the matrix precursor material so as to form a composite of $\mathcal{E}$-eucryptite particles in the matrix material.

In an embodiment, the invention provides a method for making a ceramic composite, the method comprising the steps of:

a. forming a mixture comprising particles of β-eucryptite and particles of a second ceramic material other than eucryptite, the eucryptite particles having a size between 0.1 and 10 microns;

b. sintering the mixture to form a composite material having β-eucryptite particles dispersed in a matrix of the second ceramic material; and c. cooling the composite material, thereby converting at least some of the β-eucryptite particles to $\mathcal{E}$-eucryptite

BRIEF DESCRIPTION OF THE DRAWINGS

FIG. 5a is a higher magnification view of the crack in FIG. 4a.

DETAILED DESCRIPTION OF THE INVENTION

As used herein, a composite material has a continuous matrix phase in which another phase is distributed or dispersed. In an embodiment of the present invention, eucryptite particles are distributed in a chemically different matrix phase. In an embodiment, the particles are distributed so that the majority of the particles are surrounded by the matrix phase, rather than being in contact with each another. The matrix may be a single phase or may have multiple phases. As used herein, a multiple phase matrix material can be a composite material in its own right. Suitable matrix materials for the present invention include inorganic materials such as ceramics, cement and metals and organic materials such as polymers. In different embodiments, the ceramic matrix has porosity less than 10%, less than 5% or is substantially dense. In another embodiment, the ceramic matrix does not contain substantial amounts of microcracking.

As used herein, a ceramic is an inorganic, nonmetallic, crystalline refractory material. Suitable ceramic matrices include, but are not limited to oxides (alumina, zirconia, titania, magnesia, yttrium aluminum garnet), carbides (silicon carbide, tungsten carbide), nitrides (silicon nitride, aluminum nitride), and silicides (molybdenum disilicide). In an embodiment, the ceramic matrix is an oxide.

In an embodiment, the matrix is alumina. In an embodiment, the purity of the alumina is between 90% and 100%.

In another embodiment, the matrix is zirconia. As used herein, the term zirconia encompasses zirconia materials which have been stabilized or partially stabilized with additives. For example, zirconia may be prepared in cubic stabilized form through the addition of MgO, CaO or $Y_2O_3$. Zirconia may be prepared in tetragonal zirconium polycrystal (TZP) form through the addition of rare earth oxides containing yttria or ceria.

In other embodiments, the matrix is titania (chemical formula $TiO_2$) or magnesia (nominal chemical formula MgO). In an embodiment, the purity of the titania or magnesia is between 90% and 100%.

Suitable metal matrices include, but are not limited to, steel, titanium, magnesium, zinc, and aluminum. Useful polymeric materials for the invention include those with relatively high strength which exhibit a significant amount of shrinkage during curing, such as a high strength thermo-set epoxies.

Although compressive stresses in the vicinity of the eucryptite particles are required for the β-ε phase transition, counterbalancing tensile stresses in the matrix are also present. To prevent the tensile stresses in the matrix from reaching unacceptably high values, the tensile stress can be distributed through the matrix. In an embodiment, residual tensile stresses in the matrix are below the stress at which a significant amount of matrix microcracking occurs. Residual stresses in composite materials can be modeled using a variety of techniques, including object oriented finite element modeling and conventional finite element modeling. Techniques for modeling residual stresses in composites have been described in the art, for example by Zimmerman (1999), Langer (2001), and Chawla (2003). These modeling techniques can be used to design the composite system with the appropriate distribution of residual stresses to minimize microcracking. A similar approach has been used in strengthening glass (tempering; or ion-exchange), namely that high localized compressive stresses exist at the surface, but the corresponding tensile stresses that balance the body forces are distributed over a larger volume of material, and thus do not reach the same absolute magnitude as the compressive stresses. As used herein, an insignificant amount of microcracking is below the level of microcracking which would (1) relieve the stress below the critical stress required for the phase transformation to εeucryptite to occur and/or (2) degrade the matrix strength below the value it would have without a toughening mechanism.

In an embodiment, the composites of the invention are made by combining β-eucryptite particles with a matrix precursor material then consolidating the combination of the particles and the matrix precursor material so as to form a composite of eucryptite particles in the matrix material. In an embodiment, the resulting composites include ε-eucryptite particles. Matrix precursor materials are capable of flow and capable of consolidation to form the matrix material. Matrix precursor materials include powders of the matrix material (e.g. ceramic or metal powders), and mixtures of such powders with other components (such as organic binders or, for powder mixtures in slurry form, a liquid and optional small amounts of surfactants or other chemicals to change the flow behavior of the slurry), liquids, and slurries. Consolidation may occur though sintering, solidification or curing, depending upon the matrix material.

Eucryptite particle-ceramic matrix composites can be made by mixing β-eucryptite particles with ceramic powder and then sintering. A few percent of an organic binder may also be included in the mixture; this binder would substantially burn out during processing. The ceramic powder may also be provided as part of a slurry. In different embodiments, the size of the ceramic particles being mixed with the eucryptite particles may be less than, equal to, or greater than the size of the eucryptite particles. Any technique known to those skilled in the art may be used to mix the β-eucryptite particles with the ceramic powder. Useful techniques, include, but are not limited to, ball milling. Useful sintering techniques include sintering under pressure (uniaxial or isostatic hot pressing) and pressureless sintering. It may be necessary to cold press the material prior to sintering. The sintering process may take place above the temperature at which the εphase irreversibly transforms to the α phase (600° C. in FIG. 2 for stoichiometric β-eucryptite) so long as the compressive pressure does not exceed the critical pressure for β→ε transformation. The sintering temperature will generally be within the range of temperatures typically used for sintering the matrix material, but at a temperature below the melting temperature of the eucryptite particles. In addition to the sintering temperature, other important process parameters include the sintering stress and the strength of the matrix to withstand stress during sintering.

Upon cooling, differences in the coefficient of thermal expansion (CTE) of the ceramic matrix and the eucryptite particles lead to residual stresses in the composite. In an embodiment of the present invention the composite system is selected so that the thermally induced residual stresses can lead to β→𝓔 transformation of the eucryptite particles. In addition, the composite system is selected so that the compressive thermal residual stresses developed during cooling do not exceed the critical pressure for β→𝓔 transformation at temperatures above the critical temperature for 𝓔→α transformation. Variables influencing to the CTE mismatch stress include the CTE mismatch (especially the volumetric CTE mismatch) and the CTE anisotropy. Pressure may be applied to the composite for part or all of the cooling process to control the phase of the eucryptite particles.

As commonly used, the term "thermal expansion coefficient" can refer to either the volumetric thermal expansion coefficient or the linear thermal expansion coefficient. Since hydrostatic pressures are expected to lead to the transformation from β eucryptite to ε eucryptite, the mismatch in the volumetric CTE is expected to be the most relevant to the processes of the current invention. In an isotropic material, the linear thermal expansion coefficient is approximately one third the volumetric coefficient. The value of the thermal expansion coefficient during the cooling process can depend on the pressure as well as the temperature range. For comparison purposes, Table 1 shows relative values for coefficients of thermal expansion at one bar pressure (approximately one atmosphere) for selected ceramic materials. The 𝓔-eucryptite phase has been observed only at elevated pressures. At 2.23 GPa, the linear coefficients of thermal expansion for 𝓔-eucryptite have been reported as $1.47 \times 10^{-5}$/K for the a axis, $6.65 \times 10^{-6}$/K for the b axis, $1.83 \times 10^{-6}$/K for the c axis and $2.99 \times 10^{-5}$/K volumetric (Zhang, 2002).

TABLE 1

| Material | Average Coefficient of Thermal Expansion | Temperature Range |
| --- | --- | --- |
| β-eucryptite | ~$8.6 \times 10^{-6}$/K Linear: a axis | 296-920 K (Fei, 1995) |
| β-eucryptite | ~$-18.4 \times 10^{-6}$/K Linear: c axis | 296-920 K (Fei, 1995) |
| β-eucryptite | ~$-1.2 \times 10^{-6}$/K Volumetric | 296-920 K (Fei, 1995) |
| Zirconia TZP (3 mol % $Y_2O_3$) | $10.06 \times 10^{-6}$/K Linear, a axis | 296-1073 K (Schubert, 1986) |
| Zirconia TZP (3 mol % $Y_2O_3$) | $11.61 \times 10^{-6}$/K Linear, c axis | 296-1073 K (Schubert, 1986) |
| Alumina | ~$7.3 \times 10^{-6}$/K Linear: a axis | 293-2298 K (Fei, 1995) |
| Alumina | ~$8.3 \times 10^{-6}$/K Linear: c axis | 293-2298 K (Fei, 1995) |
| Alumina | ~$23 \times 10^{-6}$/K Volumetric | 293-2298 K (Fei, 1995) |
| $TiO_2$ (rutile) | ~$8.9 \times 10^{-6}$/K Linear: a axis | 298-1883 K (Fei, 1995) |
| $TiO_2$ (rutile) | ~$11.1 \times 10^{-6}$/K Linear: c axis | 298-1883 K (Fei, 1995) |
| $TiO_2$ (rutile) | ~$28.9 \times 10^{-6}$/K Volumetric | 298-1883 K (Fei, 1995) |
| MgO | $12.0 \times 10^{-6}$/K Linear | 473 K (Miyayama, 1991) |
| MgO | $17.3 \times 10^{-6}$/K Linear | 2273 K (Miyayama, 1991) |

Eucryptite cement composites can be made by mixing β-eucryptite particles into wet cement and then allowing the cement to harden. Upon hardening, shrinkage of the cement can lead to compressive stresses in the matrix. Other reinforcement materials can also be included in the cement matrix.

Eucryptite-metal composites can be made by mixing β-eucryptite particles with metal powder and then sintering. The sintering process may take place above the temperature at which the ε phase irreversibly transforms to the α phase (600° C. in FIG. 2) so long as the compressive pressure does not exceed the critical pressure for β→𝓔 transformation. Depending upon the extent of reaction between the metal and the particles and the compressive thermal residual stresses developed during cooling, it may also be possible to make the composites via liquid metal processing. Upon cooling, differences in the coefficient of thermal expansion (CTE) of the metal matrix and the eucryptite particles lead to residual stresses in the composite. Again, the compressive thermal residual stresses developed during cooling do not exceed the critical pressure at temperatures above the critical temperature at which the 𝓔 phase irreversibly transforms to the α phase.

Eucryptite-polymer composites can be made by mixing β-eucryptite particles into the polymer and then curing the polymer. Upon curing, shrinkage of the polymer can lead to compressive stresses in the matrix.

Eucryptite particle composites can also be made by mixing β-eucryptite particles in combinations of different ceramics, metals or polymers such that the matrix is itself a composite. The composite thermal expansion properties should be such that sufficient compressive thermal residual stresses exceed the critical pressure to transform the β-phase to the ε-phase. These pressures must not be exceeded above 600° C. (for stoichiometric β-eucryptite). Examples include metal-matrix composites, ceramic-matrix composites and polymer matrix composites. Examples of composite matrices include but are not limited to silicon carbide reinforced aluminum, aluminum oxide reinforced aluminum, alumina reinforced silicon carbide, zirconia-alumina composites and glass-fiber reinforced epoxy.

Eucryptite particle composites can also be made by mixing β-eucryptite particles in any of the above matrices, and applying the necessary compressive stress externally. For example, a uniaxial or an isostatic press may be used in conjunction with heating to consolidate the body. Modeling techniques can also be used to predict the amount of external pressure to apply, as well as to predict useful values of other processing parameters.

As used herein, the term "β-eucryptite" includes lithium aluminosilicates having the approximate stoichiometric composition $LiAlSiO_4$, off stoichiometric compositions of the form $(Li_{1-x}Al_{1-x}Si_{1+x}O_4)$, and substituted stoichiometric or off-stoichiometric compositions in which Mg and/or Zn is substituted for a portion of the Li. Small amounts of impurities may also be present. When the phase of the eucryptite particles is not specified, the term "eucryptite particles" can include β-eucryptite and/or ε-eucryptite. If the phase of the eucryptite particles is specified, it is not required that each particle be a single crystal of the specified phase.

The size distribution and quantity of the eucryptite particles in the composite can vary. The particles are sufficiently large that a toughening effect can be observed. In different embodiments, the average size of the particles is between 0.1 and 10 microns, 1.0 and 10.0 microns, 3 and 10 microns and 5 and 10 microns. The particle loading is sufficiently low that the particles are surrounded by the matrix and cooled during densification and cooling/curing. In different embodiments, the composite contains between 5 and 30 volume percent or 5 and 20 volume percent eucryptite particles.

β-eucryptite can be prepared with available starting powders of lithium carbonate ($Li_2CO_3$), β-spodumene ($LiAlSi_2O_6$) and alumina ($Al_2O_3$). The starting powders are mixed in an appropriate molar ratio, and then calcined to form β-eucryptite. Alternatively, β-eucryptite powders may be synthesized by mixing lithium carbonate ($Li_2CO_3$), alumina ($Al_2O_3$), and hydrated silica ($SiO_2nH_2O$) powders with a molar ratio of 1:1:2 (Zhang 2005). The β-eucryptite product can be subsequently milled to reduce the particle size. The stoichiometry of β-eucryptite ($Li_{1-x}Al_{1-x}Si_{1+x}O_4$) can vary with the relative amounts of the starting powders, lithium carbonate ($Li_2CO_3$), β-spodumene ($LiAlSi_2O_6$) and alumina ($Al_2O_3$), or in the second example, relative amounts of lithium carbonate ($Li_2CO_3$), alumina ($Al_2O_3$), and hydrated silica ($SiO_2nH_2O$). Stoichiometry studies have been conducted with similar starting powders (substituting $SiO_2nH_2O$ for β-spodumene) (Xu 1999). For specimens in which Mg and Zn will substitute for Li, set fractions of the corresponding carbonates ($ZnCO_3$ and $MgCO_3$) can be used in the synthesis of β-eucryptite. X-ray diffraction on the powders and dense materials allows confirmation of the crystal structure.

The extent of transformation toughening can be determined by fracture toughness testing. Several standard fracture toughness tests are available, including Vickers indentation (indentation fracture), strength indentation (indentation strength), compact tension testing, and single edge pre-cracked beam testing. The compact tension specimen geometry enables measurement of fracture resistance as a function of crack growth (R-curve characterization). In an embodiment, the fracture toughness of the composite is at least 15% greater than that of the unreinforced matrix material, or a material that is reinforced with a similar reinforcement, but one that does not undergo transformation.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein. Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains.

Example 1

Particle Ejection from an Alumina-Eucryptite Composite

An alumina-eucryptite composite was prepared from 15 vol % alumina and 85 vol % β-eucryptite by the following ceramic processing route. An appropriate mixture of alumina ($Al_2O_3$), lithium carbonate ($Li_2CO_3$) and β-spodumene ($Li_2O.Al_2O_3.4SiO_2$) (for example, with a corresponding ratio by weight percent approximately 30:12:58) were mixed as dry powders in a ball mill for approximately 1 hr. The powders were then calcined in air at 1000° C. for 1 hr. Particle reduction to approximately 1 μm for each phase was accomplished by ball milling for approximately 20 hrs with water and about 1 wt. % dispersant (organic polymer). The mixture was then cold pressed and sintered at approximately 1300° C. for 10 hours in air.

A compressive load was applied to a portion of the surface of the composite via a Vickers indentation (loads ranging from 1 kg to 50 kg). When the indentation was performed in an air environment, particles were spontaneously ejected from the surface region after the indenter was removed. The particle ejection process typically lasted from 45 s to several minutes. When the indentation was performed in a dry nitrogen environment, no particle ejection was observed. The experiments with nitrogen gas suggest that moisture driven subcritical crack growth (Lawn 1993) is involved in the process.

Stresses above 0.83 GPa (the critical β-ϵ transformation stress for stoichiometric eucryptite) are common underneath an indenter, even at relatively low loads. Without wishing to be bound by any particular belief, the ejection of particles from the indentation area is believed to be driven in part by transformation of β-eucryptite regions underneath the indenter to ϵ-eucryptite. As the indenter load is released, the pressure on the composite is released. Subcritical crack growth in regions residually stressed from the indentation can lead to break-up of material in these regions. The pressure release allows the ϵ-eucryptite regions to transform back to β-eucryptite, resulting in a volume expansion. This volume expansion can impart kinetic energy to the particles leading to further break-up of material.

Example 2

A Eucryptite-$ZrO_2$ Composite

About 10 percent by weight (about 20 percent by volume) of beta-eucryptite powder (<1 μm beta-eucryptite particle size) was added to a larger amount (90 percent by weight) of zirconia powder (Tosoh TZ-3YS-E $Y_2O_3$ stabilized $ZrO_2$ mean particle size 0.4 microns). The zirconia and beta eucryptite particles were mixed in a ball mill and then vacuum hot pressed at about 35 MPa pressure, by heating to 1350° C. at 5° C./min and holding at 1350° C. for 60 min. Pressure was applied for the first 30 minutes of cooling.

Figure 4A:
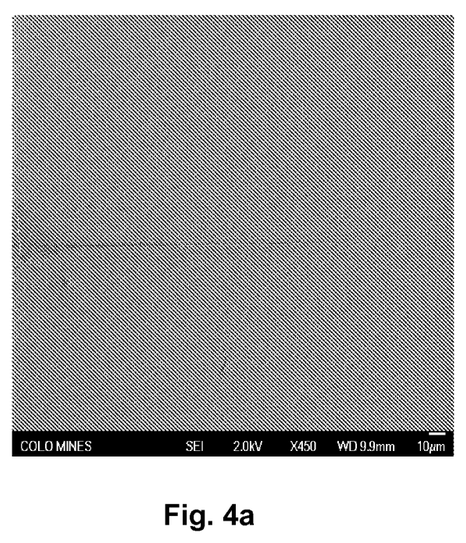
FIG. 4a illustrates a crack in $ZrO_2$ which emanates from the indent apparent in the left side of the figure.
Figure 4B:
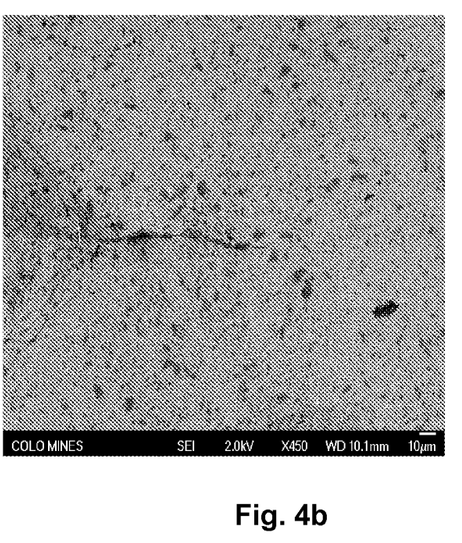
FIG. 4b illustrates a crack in a $ZrO_2$-eucryptite composite which emanates from the indent apparent in the left side of the figure.
Figure 5A:
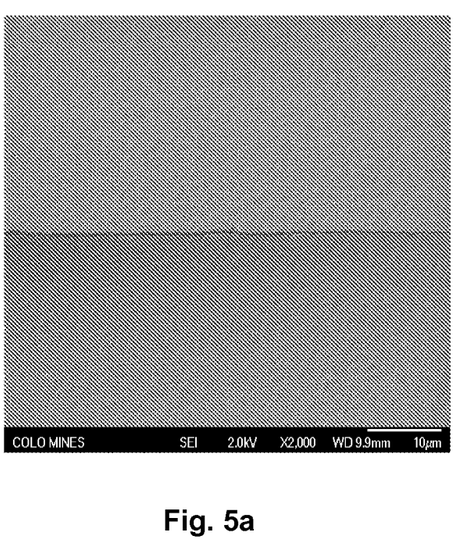
Figure 5B:
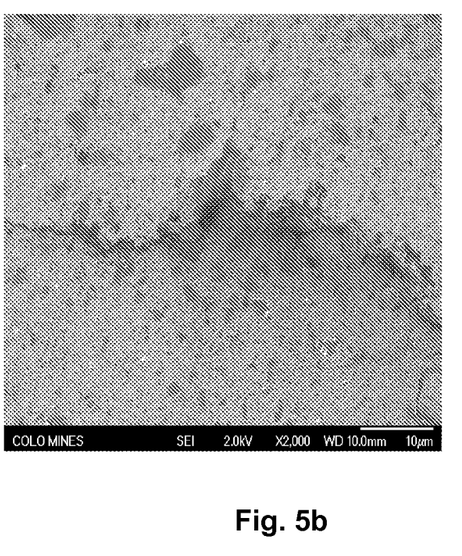
FIG. 5b is a higher magnification view of the crack in FIG. 4b.

The resulting composites were then ground and polished and Vickers indentations were placed in the surface. Cracks that emanate from the tip of the indentation may be used as a measure of fracture toughness. FIGS. 4a and 4b show cracks emanating from indentations (part of each indentation is seen on the left side of each figure). The material in FIG. 4a is pure $ZrO_2$ (hot pressed under the same conditions as the composite) while the material in FIG. 4b is the composite made with 10 wt. % beta-eucryptite. FIGS. 5a and 5b show the same cracks as in FIGS. 4a and 4b, but at higher magnification. Significant crack deflection and tortuosity is apparent in FIGS. 4b and 5b, an indication of enhanced toughness. It is apparent that the composite leads to crack deflection which normally is associated with higher toughness.

The crack lengths and the fracture toughness of both the $ZrO_2$ and the composite were estimated with the method of Anstis et al (Journal of the American Ceramic Society, Vol. 64, No. 9: 533-538 (1981)). The toughness obtained for both materials (pure $ZrO_2$ and the composite) was about 4 MPa $m^{1/2}$. It is noted that this method is known not to apply to situations where the cracking geometry is not simple.

The beta-eucryptite powder was synthesized as follows: Aqueous ball mill mixing was accomplished with $Li_2CO_3$, $Al_2O_3$, and $SiO_2$ in a molar ratio of 1:1:2. The mixture was then calcined at 1000° C. for 2 hours. The calcined mixture was then reground and recalcined at 1300° C. for 24 hours. X-ray diffraction was performed to confirm the presence of β-eucryptite. The beta-eucryptite powder was then ball milled to three different particle sizes: <1 μm, ~4 μm, and ~17 μm by milling to different times. Scanning electron microscopy and Microtac particle size analysis were used to measure the particle sizes.

REFERENCE

H. Xu, P. J. Heaney, D. M. Yates, R. B. Von Dreele and M. A. Bourke, .Structural Mechanisms Underlying Near-Zero Thermal Expansion in ®-Eucryptite: A Combined Synchrotron X-Ray and Neutron Rietveld Analysis., *J. Mater. Res*. Vol. 14, No. 7 3138-3151 (1999a).

D. C. Palmer, .Stuffed Derivatives of the Silica Polymorphs., *Reviews in Mineralogy*, Vol. 29, Eds P. J. Heaney, C. T. Prewitt, and G. V. Gibbs, Mineralogical Society of America, Washington, D.C. 83-122 (1994).

H. Xu, P. J. Heaney, A. Navrotsky, L. Topor and J. Liu, .Thermochemistry of Stuffed Quartz-Derivative Phases Along the Joint $LiAlSiO_4$—$SiO_2$., *Am. Mineralogist*, 84, 1360-1369 (1999b).

G. H. Beall, .Industrial Applications of Silica., in Silica: Physical Behavior, Geochemistry and Materials Applications, eds P. J. Heaney, C. T. Prewitt and G. V. Gibbs, Mineralogical Society of America, 29, 469-505 (1994).

M. J. Buerger, .The Stuffed Derivatives of the Silica Structure. *Am. Mineralogist*, 39, 600-614, (1954).

H. G. F. Winkler, .Synthese und Kristallstruktur des Eukryptits, $LiAlSiO_4$. *Acta Crystallographica.*, 1, 27-34 (1948).

H. Schulze and V. Tscherry, .Structural Relations Between the High- and Low-Temperature Forms of ®-Eucryptite $LiAlSiO_4$ and Low and High Quartz. I. Low Temperature Form of ®-Eucryptite and Low Quartz., *Acta Crystallographic.* B2168-2173 (1972).

V. Tscherry, H. Schulz and F. Laves, .Average and Super Structure of ®-Eucryptite ($LiAlSiO_4$). Part I. Average Structure., *Z. Kristallogr.* 135, 161-174 (1972a).

V. Tscherry H. Schulz and F. Laves, .Average and Super Structure of ®-Eucryptite ($LiAlSiO_4$). Part II. Super Structure., *Z. Kristallogr.* 135, 175-198 (1972b).

W. W. Pillars and D. R. Peacor, .The Crystal Structure of Beta Eucryptite as a Function of Temperature., *Am. Mineralogist,* 58, 681-690 (1973).

H. Guth and G. Heger, in Fast Ion Transport in Solids, eds P. Vashista, J. N. Mundy and G. K. Shenoy, Elsevier North Holland, New, p. 499 (1979).

R. Sprengard, K. Binder, M. Brandle, U. Fotheringham, J. Sauer and W. Pannhorst, .On the Interpretation of the Experimental Raman Spectrum of ®-Eucryptite $LiAlSiO_4$ from Atomistic Computer Modeling., *J. Non Crystall. Solids* 274, 264-270 (2000).

J. Zhang, Y. Zhao, H. Xu, M. V. Zelinskas, L. Wang, Y. Wang and T. Uchida, .Pressured-induced Amorphization and Phase Transformations in ®-$LiAlSiO_4$., *Chemistry of Materials,* 17, 2817-2824 (2005).

M. Hortal, R. Villar, S. Vieira, J. S. Moya, .Linear Isothermal Compressibilities of ®-Eucryptite. *J. Am. Ceram. Soc.* 58, 262 (1975).

F. A. Hummel, .Thermal Expansion Properties of Some Synthetic Lithia Minerals., *J. Am. Ceram. Soc.* 34(8), 235-239 (1951).

F. H. Gillery and E. A. Bush, .Thermal Contraction of b-Eucryptite ($Li_2O.Al_2O_3.2SiO_2$) by X-Ray and Dilatometer Methods., *J. Am. Ceram. Soc.* 42(4) 175-177 (1959).

T. Y. Tien and F. A. Hummel, .Studies in Lithium Oxide Systems: XIII, $Li_2O.Al_2O_3.2SiO_2$—$Li_2O.Al_2O_3.2GeO_2$, *J. Am. Ceram. Soc.* 47(11) 582-584 (1964).

B. L. Phillips, H. Xu, P. J. Heaney and A. Navrotsky, $._{29}Si$ and $_{27}Al$ MAS-NMR Spectroscopy of ®-Eucryptite ($LiAlSiO_4$): The Enthalpy of Si, Al Ordering., *Am. Mineralogist,* 85, 181-188 (2000).

H. Xu, P. J. Heaney and A. Navrotsky, .Thermal Expansion and Structural Transformations of Stuffed Derivatives of Quartz Along the $LiAlSiO_4$—$SiO_2$ Join: a Variable-Temperature Powder Synchrotron XRD Study., *Phys. Chem. Minerals,* 28, 302-312 (2001).

V. Dondu and R. Dimitrijevic, .The Thermal Transformations of NaLiA Zeolites, a New Polymorph in the System $Li_2O$—$Al_2O_3$—$SiO_2$., *Journal of Solid State Chemistry,* 63, 46-51 (1986).

J. Zhang, A. Celestian, J. B. Parise, H. Xu and P. J. Heaney, .A New Polymorph of Eucryryptite ($LiAlSiO_4$), ε-Eucryptite, and Thermal Expansion of α and ε-Eucryptite at High Pressure. *Am. Mineralogist*, Vol. 87, 566-571 (2002).

S. Sharma and S. Sikka, .Pressure Induced Amorphization of Materials., *Prog. Mater. Sci.* 40, 1 (1996).

H. Xu, P. J. Heaney and G. Beall, .Phase Transitions Induced by Solid Solution in Stuffed Derivatives of Quartz: a Powder Synchrotron XRD Study of the $LiAlSiO_4$—$SiO_2$ Join., *Am. Mineralogist* 85, 971-979 (2000).

P. Richet and P. Gillet, .Pressure-induced Amorphization of Minerals: a Review., *European Journal of Mineralogy,* 9 907-933 (1997).

Y. Huang, .IR Spectroscopic Study of the Effects of High Pressure on Zeolites Y, A and Sodalite., *Journal of Materials Chemistry,* 8 1067-1071 (1998).

R. A. Secco and Y. Huang, Pressure-induced Disorder in Hydrated Na-A Zeolite. *Journal of Physics and Chemistry of Solids,* 60, 999. 1002 (1999).

H. Xu, Los Alamos National Laboratory, personal communication (2005).

B. Lawn, Fracture in Brittle Solids, $2_{nd}$ Edition, Cambridge Solid State Series, Cambridge (1993).

D. J. Green, R. H. Hannink and M. V. Swain, Transformation Toughening of Ceramics, CRC Press Boca Raton (1989).

M. Ruhle, A. G. Evans, R. M. McMeeking, P. G. Charalambides, and J. W. Hutchinson, .High Toughness Ceramics., *Acta Metallurgica*, 35, 2701, (1987).

W. M. Kriven, .Shear Transformations in Inorganic Materials., Proc. of an International Conference on Solid to Solid Phase Transformations, 1507. 1532 (1982).

A. Zimmermann, E. R. Fuller, Jr., and J. Rodel, .Residual Stress Distribution in Ceramics., *J. Am. Ceram. Soc.* 82(11), 3144-3160 (1999).

S. A. Langer, E. R. Fuller, Jr., W. C. Carter, "OOF: An Image-Based Finite-Element Analysis of Material Microstructures," *Computing Sci. Eng.*, 3 (3) 15-23 (2001).

N. Chawla, B. V. Patel, M. Koopman, K. K. Chawla, R. Saha, B. R. Patterson, E. R. Fuller, and S. A. Langer, .Microstructure-Based Simulation of Thermomechanical Behavior of Composite Materials by Object Oriented Finite (OOF) Element Analysis., *Mater. Charac.*, 49, 395-407 (2003).

T. Shimada, M. Mizuno, K. Kurachi, N. Kata, O. Sakurado, M. Hashiba, and Y. Nurishi, .Simultaneous Fabrication of a Composite with Low Thermal Expansion and High Strength in the Eucryptite-Yttria-Stabilized PSZ System., *J. Mater. Sci.* 31, 3691-3695 (1996).

L. D. Wang, W. D Fei, L. S. Jiang, and C. K. Yao, .New Aluminum Matrix Composite with Much Lower Coefficient of Thermal Expansion and Higher Strength., *J. Mater. Sci. Lett.* 21, 737-738 (2002).

H. Xu, P. J. Heaney, A. Navrotsky, L. Topor and J. Liu, Thermochemistry of Stuffed Quartz-Derivative Phases Along the Join $LiAlSiO_4$—$SiO_2$., *Am. Mineralogist*, 84, 1360-1369 (1999c).

Y. Fei, Thermal Expansion, Mineral Physics and Crystallography, A Handbook of Physical Constants, AGU Reference Shelf 2, 1995, American Geophysical Union, pp 29-44.

H. Schubert, Anisotropic Thermal Expansion Coefficients of $Y_2O_3$ stabilized Tetragonal Zirconia, J. Am. Ceram. Soc. Vol. 69(3), pp 270-271 (1986).

M. Miyayama et al., Engineering Properties of Single Oxides, Engineered Materials Handbook, Vol. 4, pp 748-757 (1991).

We claim:

1. A ceramic composite material consisting essentially of:
   a. a crystalline ceramic matrix material having a porosity less than 10%, the ceramic material being other than eucryptite; and
   b. eucryptite particles dispersed in the matrix material, the particles having a size between 0.1 and 10 microns and the volume fraction of the particles being between 5 and 20 volume percent, wherein at least some of the eucryptite particles are $\epsilon$-eucryptite particles
   wherein the ceramic composite material is made by
   forming a mixture comprising particles of $\beta$-eucryptite and particles of the non-eucryptite ceramic material, sintering the mixture to form a precursor composite material having $\beta$-eucryptite particles dispersed in the non-eucryptite ceramic matrix material, and cooling the precursor composite material, the non-eucryptite ceramic material being selected so that the cooling process leads to compressive stresses in the vicinity of the $\beta$-eucryptite particles sufficient to transform at least some of the $\beta$-eucryptite particles to $\epsilon$-eucryptite particles.

2. The composite material of claim 1, wherein the matrix material is zirconia.

3. The composite material of claim 1, wherein the size of the eucryptite particles is between 1 micron and 10 microns.

4. The composite material of claim 1, wherein the matrix material is titania.

5. The composite material of claim 1, wherein the ceramic matrix is not significantly microcracked.

6. The composite material of claim 1, wherein the porosity of the ceramic matrix is less than 5%.

7. A ceramic composite material consisting essentially of:
   a. a crystalline matrix material selected from the group consisting of alumina and zirconia, the matrix material having a porosity less than 5%, and
   b. eucryptite particles dispersed in the matrix material, the particles having a size between 0.1 and 10 microns and the volume fraction of the particles being between 5 and 20 volume percent, wherein at least some of the eucryptite particles are $\epsilon$-eucryptite particles
   wherein the ceramic composite material is made by
   forming a mixture comprising particles of $\beta$-eucryptite and particles of alumina or zirconia, sintering the mixture to form a precursor composite material having $\beta$-eucryptite particles dispersed in the alumina or zirconia matrix material, and cooling the precursor composite material such that the cooling process leads to compressive stresses in the vicinity of the $\beta$-eucryptite particles sufficient to transform at least some of the $\beta$-eucryptite particles to $\epsilon$-eucryptite particles.

8. The composite material of claim 7, wherein the eucryptite particles are between 1 microns and 10 microns.

9. The composite material of claim 7, wherein the matrix material is alumina.

10. The composite material of claim 7, wherein the matrix material is not significantly microcracked.

11. The composite material of claim 7, wherein the matrix material is zirconia.

12. The composite material of claim 1, wherein the matrix material is magnesia.

13. The composite material of claim 1, wherein the matrix material is alumina.

* * * * *